(12) United States Patent
Zhao et al.

(10) Patent No.: US 12,319,884 B2
(45) Date of Patent: Jun. 3, 2025

(54) BIOMASS FRACTIONATION METHOD FOR PRODUCING BIOMASS OF VARYING ASH CONTENT AND USES THEREOF

(71) Applicant: UT-Battelle, LLC, Oak Ridge, TN (US)

(72) Inventors: Xianhui Zhao, Knoxville, TN (US); Oluwafemi Oyedeji, Knoxville, TN (US); Soydan Ozcan, Oak Ridge, TN (US); Halil Tekinalp, Knoxville, TN (US); Erin G. Webb, Luttrell, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/373,400

(22) Filed: Sep. 27, 2023

(65) Prior Publication Data

US 2024/0199966 A1 Jun. 20, 2024

Related U.S. Application Data

(60) Provisional application No. 63/432,741, filed on Dec. 15, 2022.

(51) Int. Cl.
*C10L 5/44* (2006.01)
*C08L 97/02* (2006.01)

(52) U.S. Cl.
CPC .............. *C10L 5/445* (2013.01); *C08L 97/02* (2013.01); *C10L 2200/0209* (2013.01);
(Continued)

(58) Field of Classification Search
CPC .............. C10L 5/445; C10L 2200/0209; C10L 2200/0213; C10L 2200/0218;
(Continued)

(56) References Cited

U.S. PATENT DOCUMENTS 9,068,746 B2 6/2015 Kawasaki et al.
2010/0281765 A1* 11/2010 Schwartz ............ A23K 20/147
426/52

(Continued)

FOREIGN PATENT DOCUMENTS

WO 2019205682 A1 10/2019

OTHER PUBLICATIONS

ASTM International, "Standard practice for compression molding thermoplastic materials into test specimens, plaques, or sheets", Previous edition approved in 2010, Current edition approved Apr. 1, 2016, pp. 1-6, D4703-16.
(Continued)

*Primary Examiner* — Ellen M McAvoy
(74) *Attorney, Agent, or Firm* — Scully, Scott, Murphy & Presser, P.C.

(57) ABSTRACT

A method for fractionating biomass material according to ash content, the method comprising: grinding the biomass material to produce a ground biomass and sieving the ground biomass through a first screen to yield: a) a first fraction of biomass particles that does not pass through the first screen and which has a first particle size, and b) a second fraction of biomass particles that passes through the first screen and which has a second particle size, wherein the second particle size is smaller than the first particle size, and wherein the second fraction of biomass particles has a higher ash content than the first fraction of biomass particles; and optionally further comprising: passing the second fraction of biomass particles through a second screen having a finer mesh size to produce a third fraction having a smaller particle size and a higher ash content than the second fraction of biomass particles.

25 Claims, 13 Drawing Sheets

1A

1B

(52) U.S. Cl.
CPC .............. *C10L 2200/0213* (2013.01); *C10L 2200/0218* (2013.01); *C10L 2200/0236* (2013.01); *C10L 2200/024* (2013.01); *C10L 2200/0484* (2013.01); *C10L 2250/06* (2013.01); *C10L 2290/08* (2013.01); *C10L 2290/28* (2013.01); *C10L 2290/546* (2013.01)

(58) Field of Classification Search
CPC ....... C10L 2200/0236; C10L 2200/024; C10L 2200/0484; C10L 2250/06; C10L 2290/08; C10L 2290/28; C10L 2290/546; C08L 97/02
See application file for complete search history.

(56) References Cited

U.S. PATENT DOCUMENTS

| | | | | |
|---|---|---|---|---|
| 2016/0369305 | A1* | 12/2016 | Piriou | C12P 5/023 |
| 2018/0319959 | A1* | 11/2018 | Suriyachai | C08H 8/00 |
| 2018/0334618 | A1 | 11/2018 | Freel et al. | |

OTHER PUBLICATIONS

Bhagia, S., "Critical review of FDM 3D printing of PLA biocomposites filled with biomass resources, characterization, biodegradability, upcycling and opportunities for biorefineries", Applied Materials Today 24 (2021), Received Mar. 19, 2021, Revised Apr. 29, 2021 Accepted May 19, 2021, pp. 1-29, 101078.

Bharne, M.T., et al., "Mechanical & Thermal Properties of Fly Ash Filled ABS", International Journal of Engineering Research & Technology (IJERT), Feb. 2014, pp. 750-756, vol. 3 Issue 2.

Cao, D., et al., "Amphipathic Binder Integrating Ultrathin and Highly Ion-Conductive Sulfide Membrane for Cell-Level High-Energy-Density All-Solid-State Batteries", Adv. Mater. 2021, Received Jul. 16, 2021, Revised Sep. 24, 2021, Published online Oct. 15, 2021, pp. 1-13, 33, 2105505.

Chabbert, B., et al., "Multimodal assessment of flax dew retting and its functional impact on fibers and natural fiber composites", Industrial Crops & Products 148 (2020), Received Aug. 9, 2019, Received in revised form Jan. 27, 2020, Accepted Feb. 19, 2020, Available online Mar. 8, 2020, pp. 1-12, 112255.

Chen, K.-W., et al., "Effect of Carbon Ash Content on the Thermal and Combustion Properties of Waste Wood Particle / Recycled Polypropylene Composites", MATEC Web of Conferences 06069 (2016), SMAE 2016, pp. 1-6, 67.

Daramola, O.O., et al., "Influence of Bamboo Stem Ash on Some Properties of Polyester Matrix", SVOA Materials Science and Technology 2:1 (2020), Accepted Jan. 24, 2020, Published Mar. 5, 2020, pp. 1-8.

Goh, C.K., et al., "Effects of different surface modification and contents on municipal solid waste incineration fly ash/epoxy composites", Waste Management 58 (2016), pp. 309-315.

Hao, X., et al., "Effects of fiber geometry and orientation distribution on the anisotropy of mechanical properties, creep behavior, and thermal expansion of natural fiber/HDPE composites", Composites Part B 185 (2020), Received Aug. 23, 2019, Received in revised form Dec. 28, 2019, Accepted Jan. 15, 2020, Available online Jan. 21, 2020, pp. 1-9, 107778.

Kenney, K.L., et al., "Understanding biomass feedstock variability", Biofuels (2013), Published online Apr. 9, 2014, pp. 111-127, 4(1).

Kim, J.H., et al., "Decrease in Viscosity Caused by Agglomeration and Particle Dispersion in Cement-Fly Ash Suspensions", Transportation Research Record: Journal of the Transportation Research Board, 2675 (2020), 8 pages.

Lacey, J.A., et al., "Wear Properties of Ash Minerals in Biomass", Frontiers in Energy Research, Received May 15, 2018, Accepted Oct. 22, 2018, Published Nov. 9, 2018, pp. 1-6, vol. 6, Article 119.

Lacey, J.A., et al., "Removal of introduced inorganic content from chipped forest residues via air classification", Fuel 160 (2015), pp. 265-273.

Lee, K., et al., "Composition-Preserving Extraction and Characterization of Biomass Extrinsic and Intrinsic Inorganic Compounds", ACS Sustainable Chem. Eng. 2020, Received Oct. 29, 2019, Revised Dec. 11, 2019, Published Jan. 2, 2020, pp. 1599-1610, 8.

Li, K., et al., "Poly(lactic acid) Toughening through Chain End Engineering", ACS Appl. Polym. Mater. 2020, Received Sep. 20, 2019, Accepted Dec. 6, 2019, Published Dec. 6, 2019, pp. 411-417, 2.

Li, K., et al., "Surface-modified and oven-dried microfibrillated cellulose reinforced biocomposites: Cellulose network enabled high performance", Carbohydrate Polymers 256 (2021), Received Sep. 10, 2020, Received in revised form Dec. 11, 2020, Accepted Dec. 13, 2020, Available online Dec. 28, 2020, pp. 1-12 117525.

Li, Y., et al., "Composite material composed of fly ash and waste polyethylene terephthalate", Iowa State University Patents, Jun. 24, 2003, pp. 1-19, 66.

Maulida, et al., "The Tensile Strenght Properties Effect of Rice-Husk Ash as on the Composite of Plastic Drinking Bottle Waste", International Journal of Scientific & Technology Research, Apr. 2015, pp. 66-69, vol. 4, Issue 4.

Meng, X., et al., "Synthesis, Characterization, and Utilization of a Lignin-Based Adsorbent for Effective Removal of Azo Dye from Aqueous Solution", ACS Omega 2020, Received Nov. 2, 2019, Accepted Jan. 23, 2020, Published Feb. 6, 2020, pp. 2865-2877, 5.

Oyedeji, O., et al., "Kinetics of the release of elemental precursors of syngas and syngas contaminants during devolatilization of switchgrass", Bioresource Technology 244 (2017), Received Jun. 13, 2017, Received in revised form Jul. 26, 2017, Accepted Jul. 27, 2017, Available online Jul. 29, 2017, pp. 525-533.

Ozyhar, T., et al., "Effect of functional mineral additive on processability and material properties of wood-fiber reinforced poly(lactic acid) (PLA) composites", Composites Part A 132 (2020), Received Nov. 27, 2019, Received in revised form Jan. 24, 2020, Accepted Feb. 8, 2020, Available online Feb. 13, 2020, pp. 1-8, 105827.

Saba, N., et al., "Thermal and dynamic mechanical properties of cellulose nanofibers reinforced epoxy composites", International Journal of Biological Macromolecules 102 (2017), Sep. 2017, pp. 822-828.

Sanusi, O.M., et al., "Development of Wood-ash/Resin Polymer Matrix Composite for Body Armour Application", FUOYE Journal of Engineering and Technology, Sep. 2016, pp. 10-14, vol. 1, Issue 1.

Sanusi, O.M., et al., "Influence of Wood Ash on the Mechanical Properties of Polymer Matrix Composite Developed from Fibre Glass and Epoxy Resin", Dec. 2013, pp. 344-352, vol. 2, Issue 12.

Sim, J., et al., "Preparation of Fly Ash/Epoxy Composites and Its Effects on Mechanical Properties", Polymers 2020, Received Dec. 4, 2019, Accepted Dec. 30, 2019, Published Jan. 2, 2020 pp. 1-12, 12, 79.

Sluiter, A., et al., "Determination of Ash in Biomass", http://www.nrel.gov/biomass/pdfs/42622.pdf, Technical Report NREL/TP-510-42622, Jan. 2008, pp. 1-5.

Tekinalp, H.L., et al., "Highly oriented carbon fiber-polymer composites via additive manufacturing", Composites Science and Technology 105 (2014), Received Jun. 20, 2014, Received in revised form Oct. 3, 2014, Accepted Oct. 9, 2014, Available online Oct. 16, 2014, pp. 144-150.

Thyrel, M., et al., "A method for differentiating between exogenous and naturally embedded ash in bio-based feedstock by combining ED-XRF and NIR spectroscopy", Biomass and Bioenergy 122 (2019), Received Oct. 19, 2017, Received in revised form Dec. 12, 2018, Accepted Dec. 18, 2018, Available online Jan. 29, 2019, pp. 84-89.

Van Der Merwe, E.M., et a., "Characterization of the surface and physical properties of South African coal !y ashmodi"ed by sodium lauryl sulphate (SLS) for applications in PVC composites", Powder Technology 266 (2014), Received Apr. 4, 2014, Received in revised form Jun. 4, 2014, Accepted Jun. 6, 2014, Available online Jun. 16, 2014, pp. 70-78.

(56) References Cited

OTHER PUBLICATIONS

Vassilev, S.V., et al., "An overview of the composition and application of biomass ash. Part 2. Potential utilisation, technological and ecological advantages and challenges", Fuel 105 (2013), Received Jul. 18, 2012, Received in revised form Oct. 1, 2012, Accepted Oct. 1, 2012, Available online Oct. 17, 2012, pp. 19-39.

Wang, L., et al., "Towards industrial-scale production of cellulose nanocomposites using melt processing: A critical review on structure-processing-property relationships", Composites Part B 201 (2020), Received Mar. 5, 2020, Received in revised form Jul. 17, 2020, Accepted Jul. 23, 2020, Available online Aug. 26, 2020, pp. 1-21, 108297.

Wang, L., et al., "Review on Nonconventional Fibrillation Methods of Producing Cellulose Nanofibrils and Their Applications", Biomacromolecules 2021, Received May 20, 2021, Revised Aug. 24, 2021, Published Sep. 10, 2021, pp. 4037-4059, 22.

Wang, Y., et al., "Toughening by Nanodroplets: Polymer-Droplet Biocomposite with Anomalous Toughness", Macromolecules 2020, Received Dec. 25, 2019, Revised Mar. 10, 2020, Published Apr. 17, 2020, pp. 4568-4576, 53.

Yiga, V.A., et al., "Flame retardancy and thermal stability of agricultural residue fiber-reinforced polylactic acid: A Review", Polymer Composites 2021, Received Sep. 2, 2020, Revised Sep. 18, 2020, Accepted Sep. 22, 2020, pp. 15-44, 42.

Yildiz, G., et al., "Effect of biomass ash in catalytic fast pyrolysis of pine wood", Applied Catalysis B: Environmental 168-169 (2015), Received Sep. 11, 2014, Received in revised form Dec. 19, 2014, Accepted Dec. 23, 2014, Available online Dec. 27, 2014, pp. 203-211.

Zhao, X., et al., "Poplar as Biofiber Reinforcement in Composites for Large-Scale 3D Printing", ACS Appl. Bio Mater. 2019, Received Jul. 28, 2019, Accepted Sep. 18, 2019, Published Sep. 18, 2019, pp. 4557-4570, 2.

Zhao, X., et al., "Bio-treatment of poplar via amino acid for interface control in biocomposites", Composites Part B 199 (2020), Received Sep. 27, 2019, Received in revised form May 12, 2020, Accepted Jun. 27, 2020, Available online Jul. 30, 2020, pp. 1-11, 108276.

Zhao, X., et al., "High-Strength Polylactic Acid (PLA) Biocomposites Reinforced by Epoxy-Modified Pine Fibers", ACS Sustainable Chem. Eng. 2020, Received May 10, 2020, Revised Jun. 26, 2020, Published Jul. 20, 2020, pp. 13236-13247, 8.

Zhao, X., et al., "Plastic waste upcycling toward a circular economy", Chemical Engineering Journal 428 (2022), Received Jun. 1, 2021, Received in revised form Aug. 5, 2021, Accepted Aug. 16, 2021, Available online Aug. 21, 2021, pp. 1-16, 131928.

Zhao, X., et al., "Recycling of natural fiber composites: Challenges and opportunities", Resources, Conservation & Recycling 177 (2022), Received Jun. 7, 2021, Received in revised form Sep. 7, 2021; Accepted Oct. 1, 2021, Available online Oct. 22, 2021, 25 pages, 105962.

PCT Invitation to Pay Additional Fees received in PCT/US23/33797 dated Jan. 3, 2024, 5 pages.

Smolka-Danielowska, D., et al., "Chemical and mineral composition of ashed from wood biomass combustion in domestic wood-fired furnaces", International Journal of Environmental Science and Technology (2022), Received Jan. 12, 2021, Revised Jun. 6, 2021, Accepted Jun. 23, 2021, 14 pages.

International Search Report and Written Opinion received in PCT/US23/33797 dated Apr. 9, 2024, 13 pages.

Zhao, X., et al., "Impact of biomass ash content on biocomposite properties", Composites Part C: Open Access, 2022, pp. 1-12, 100319, 9.

\* cited by examiner 8A 8B

BIOMASS FRACTIONATION METHOD FOR PRODUCING BIOMASS OF VARYING ASH CONTENT AND USES THEREOF

CROSS REFERENCE TO RELATED APPLICATION

The present application claims benefit of U.S. Provisional Application No. 63/432,741, filed on Dec. 15, 2022, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to methods for processing biomass, and more particularly, for the purpose of producing separate fractions of the biomass differing in ash content.

BACKGROUND

Biomass ash mainly contains inorganic compounds rich in alkali and alkaline earth metals. There are two categories of biomass ash, namely physiological and exogenous ash, depending on their source. Physiological ash is intrinsic to biomass tissue, resulting from mineral uptake during plant growth. Biomass feedstock type, growing environment, and silviculture practices all contribute to and affect the amount of biomass physiological ash. Conversely, exogenous ash is extrinsic to biomass tissue, consisting of dirt and soil loosely attached to biomass particle surfaces. Although exogenous ash can accumulate on plants during growth, it is primarily collected during the harvesting and handling of biomass feedstock. Biomass ash has been demonstrated to have a significant impact on biomass size reduction, flowability, reactivity, and feedstock quality variability. Biomass ash is the major cause of abrasive wear in biomass processing equipment, especially size reduction equipment in which biomass and size reduction tools interact at high velocities (J. A. Lacey et al., *Frontiers in Energy Research*, 6, 119, 2018).

Biomass ash is known to be a significant hindrance in biomass-to-biofuel production processes. For this reason, production of low ash biomass would facilitate the production of biofuel from biomass. Moreover, while biomass having a normal to high ash content is unsuitable in biomass-to-biofuel production processes, such biomass may be suitable for use in producing polymer-biomass composite materials. For this reason, high ash biomass would further the production of biomass composite materials. Thus, there would be a significant benefit in a process that could fractionate biomass materials into lower and higher ash fractions, thereby expanding and improving the use of biomass in a variety of applications.

SUMMARY

In one aspect, the invention is directed to a method for fractionating biomass material according to ash content. The method processes the biomass to result in at least two fractions of the biomass differing in ash content and particle size. The method more specifically entails grinding and sieving the biomass to result in at least two fractions of the biomass differing in ash content and particle size. Generally, the fraction containing a smaller particle size has a higher ash content than the fraction containing a larger particle size. The method described herein advantageously expands and improves the use of biomass for a variety of applications, e.g., lower ash content biomass for use in biomass-to-biofuel production processes and higher ash content biomass for use in producing polymer-biomass composite materials.

More specifically, the method includes the following steps: grinding the biomass material to produce a ground biomass and sieving the ground biomass through a first screen to yield: a) a first fraction of biomass particles that does not pass through the first screen and which has a first particle size, and b) a second fraction of biomass particles that passes through the first screen and which has a second particle size, wherein the second particle size is smaller than the first particle size, and wherein the second fraction of biomass particles has a higher ash content than the first fraction of biomass particles (or conversely, the first particle size is larger than the second particle size, and wherein the first fraction of biomass particles has a lower ash content than the second fraction of biomass particles). In some embodiments, the method further includes: passing the second fraction of biomass particles through a second screen having a finer mesh size to produce a third fraction of biomass that passes through the second screen and which has a third particle size which is smaller than the second particle size, wherein the third fraction of biomass has a higher ash content than the second fraction of biomass particles. In separate or further embodiments, prior to the grinding step, the biomass material is subjected to a drying process to reduce the moisture content. In separate or further embodiments, the ground biomass, before or after sieving (e.g., the first, second, or third fraction), is subjected to an ultrasonication process to result in a reduced ash content of the ultrasonicated ground biomass.

In some embodiments, the ground biomass before sieving has a maximum particle size of 1000 microns. In other embodiments, the ground biomass before sieving has a maximum particle size of 500 microns, 400 microns, 300 microns, 200 microns, or 100 microns. In some embodiments, the first fraction of biomass particles has an ash content less than 1 wt % and the second fraction of biomass particles has an ash content greater than 1 wt % or at least or greater than 2, 3, 4, or 5 wt %. The biomass typically is or includes lignocellulosic matter generally regarded as waste or non-edible material, such as corn stover, grasses, hull material, wood, hemp, flax, and sugarcane (e.g., bagasse).

In another aspect, the invention is directed to a method for producing a biofuel from biomass containing a reduced ash content relative to the original biomass, wherein the biomass having a reduced ash content may be produced by the method described above including any of its possible embodiments. The method includes any one or more of the above described steps for producing a first fraction (and optionally, one or more successive fractions) of biomass particles containing a lower ash content than the original biomass not processed by the above fractionation method, and subjecting the first fraction (or a successive fraction) of biomass particles to a biomass-to-biofuel conversion process. In embodiments, the first fraction (or optionally, a successive fraction) of biomass particles is subjected to an ultrasonication process to further reduce the ash content of the first fraction (or a successive fraction) before the first fraction or successive fraction is subjected to a biomass-to-biofuel conversion process. The first fraction or successive fraction of biomass particles may have an ash content of less than or no more than, for example, 1 wt %, 0.8 wt %, 0.5 wt %, 0.2 wt %, or 0.1 wt %.

In another aspect, the invention is directed to a method for producing a polymer-biomass composite material using biomass having an increased ash content relative to the original biomass, wherein the biomass having an increased ash content may be produced by the method described above including any of its possible embodiments. The method includes any one or more of the above described steps for producing a second fraction (or a successive fraction) of biomass particles containing a higher ash content than the original biomass not processed by the above fractionation method, and melt compounding the second fraction (or successive fraction) of biomass particles with a thermoplastic polymer to produce the polymer-biomass composite material. In embodiments, the polymer-biomass composite material produced in the melt compounding step is subjected to hot pressing and/or compression molding. The thermoplastic polymer may be selected from, for example, polyesters, rubbers, and polyolefins. The second fraction (or a successive fraction) of biomass particles in the composite may have an ash content of at least or greater than, for example, 1 wt %, 2 wt %, 3 wt %, 4 wt %, 5 wt %, 8 wt %, or 10 wt %.

BRIEF DESCRIPTION OF THE DRAWINGS

FIG. 1A is a scanning electron microscope (SEM) image of fracture surfaces of neat PLA. FIG. 1B is the same image at higher magnification.

FIG. 2A is a SEM image of fracture surfaces of a switchgrass I/PLA composite. FIG. 2B is the same image at higher magnification.

FIG. 3A is a SEM image of fracture surfaces of a switchgrass II/PLA composite. FIG. 3B is the same image at higher magnification.

FIG. 4A is a SEM image of fracture surfaces of a switchgrass III/PLA composite. FIG. 4B is the same image at higher magnification.

FIG. 5A is a SEM image of fracture surfaces of a corn stover I/PLA composite. FIG. 5B is the same image at higher magnification.

FIG. 6A is a SEM image of fracture surfaces of a corn stover II/PLA composite. FIG. 6B is the same image at higher magnification.

FIG. 7A is a SEM image of fracture surfaces of a corn stover III/PLA composite. FIG. 7B is the same image at higher magnification.

FIG. 8A is a SEM image of fracture surfaces of a corn stover IV/PLA composite. FIG. 8B is the same image at higher magnification.

FIG. 9A is a SEM image of fracture surfaces of a corn stover V/PLA composite. FIG. 9B is the same image at higher magnification.

DETAILED DESCRIPTION

Figures 1A, 1B:
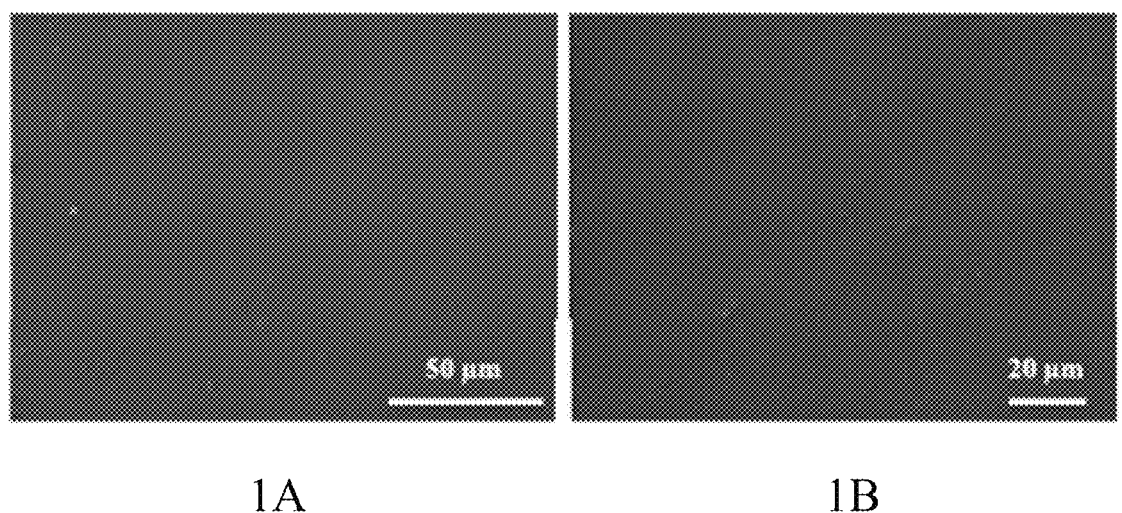
FIGS. 1A-1B.

In a first aspect, the present disclosure is directed to a method for fractionating biomass material according to ash content. The term "ash," as used herein, refers to primarily inorganic material, composed primarily of oxides and typically containing at least two, three, or more three elements selected from Ca, Fe, Mg, K, Si, Al, S, P, and Mn. The method described herein processes the biomass to result in at least two, three, or four fractions of the biomass differing in ash content. The method more specifically entails grinding and sieving the biomass to result in at least two, three, or four fractions of the biomass differing in ash content and particle size. By virtue of the grinding and sieving process employed in the present method, the fraction containing a smaller particle size of biomass particles typically has a higher ash content than the fraction of biomass particles having a larger particle size.

In the method, a biomass material is subjected to a grinding process to produce a ground biomass composed of biomass particles. The ground biomass is sieved through one or more screens to separate the ground biomass into at least two fractions differing in particle size. Notably, in one embodiment, the biomass is completely ground before being sieved, while in another embodiment, the biomass undergoes grinding and sieving simultaneously. In different embodiments, depending on the extent and manner of grinding as well as the form of the original biomass material, the ground biomass before contacting the screen has a maximum particle size of 5000, 4000, 3000, 2500, 2000, 1500, 1000, 500, 400, 300, 250, 200, 100, 50, or 20 microns. The ground biomass typically contains a range of particle sizes, which may be bounded by any two of the foregoing particle sizes, such as, for example, 20-5000 microns, 50-5000 microns, 100-5000 microns, 200-5000 microns, 300-5000 microns, 400-5000 microns, 500-5000 microns, 50-2000 microns, 100-2000 microns, 200-2000 microns, 300-2000 microns, 400-2000 microns, 500-2000 microns, 20-1000 microns, 50-1000 microns, 100-1000 microns, 200-1000 microns, 300-1000 microns, 400-1000 microns, 500-1000 microns, 20-500 microns, 50-500 microns, 100-500 microns, 200-500 microns, 300-500 microns, 400-500 microns, 20-250 microns, 50-250 microns, 100-250 microns, 200-250 microns, 20-100 microns, or 20-50 microns. Any of the foregoing particle size ranges may be considered to be exclusive or inclusive.

The ground biomass is sieved through a first screen having a uniform mesh size which retains a first portion of the ground biomass while permitting a second portion of the ground biomass to pass through the screen. The first fraction of biomass particles has a particle size (i.e., "first particle size") which is too large to pass through the screen, while the second fraction of biomass particles has a particle size (i.e., "second particle size") small enough to pass through the screen; thus, by the grinding and sieving steps, two fractions of different particle sizes are obtained, i.e., a second particle size which is smaller than the first particle size. Moreover, as ash particles are generally smaller than any of the biomass particles, the ash particles pass through the screen and increase the ash content of the second fraction that has passed through the screen.

The screen (i.e., first screen or any subsequent screen) has any desired aperture (opening or pore) size to separate the ground biomass into different size fractions as desired. The first screen (or any subsequent screen) may have an aperture size of, for example, 5000, 4000, 3000, 2500, 2000, 1500, 1000, 500, 400, 300, 200, 180, 150, 100, or 50 microns, which results in a first fraction having a size greater than 5000, 4000, 3000, 2500, 2000, 1500, 1000, 500, 400, 300, 200, 180, 150, 100, or 50 microns, respectively, and a second fraction having a size up to or less than 5000, 4000, 3000, 2500, 2000, 1500, 1000, 500, 400, 300, 200, 180, 150, 100, or 50 microns, respectively. In each exemplary case, the second (smaller particle size) fraction contains a higher ash content than the first (larger particle size) fraction. Notably, the term "aperture size" corresponds to the size of openings in the screen, whereas the term "mesh size," as well known in the art, corresponds to the number of openings per unit length or area. Thus, a screen with a higher mesh size has a smaller aperture size. The term "finer mesh size" corresponds to a screen having a smaller aperture (opening) size, and thus, a higher mesh number. Conversely, the term "coarser mesh size" corresponds to a screen having a larger aperture size, and thus, a lower mesh number.

By the sieving process, the particle size of the first fraction generally does not overlap or may overlap to a minute extent (e.g., no more than or less than 1%, 2%, or 5% of particles) with the particle size of the second fraction. Typically, the first and second fractions contain ranges of particle sizes, which may be selected from any of the exemplary ranges provided above, provided that the ranges do not overlap or overlap to a minute extent. The term "particle size," as used anywhere in this application, may refer to a range of particle sizes within the bounds of minimum and maximum particle sizes. For example, if a screen having an aperture size of 500 microns is used, the first fraction may contain particle sizes within a range of 500-2000 microns or 500-1000 microns while the second fraction may contain particle sizes within a range of 20-500 microns, 50-500 microns, or 100-500 microns. As another example, if a screen having an aperture size of 200 microns is used, the first fraction may contain particle sizes within a range of 200-2000 microns or 200-1000 microns while the second fraction may contain particle sizes within a range of 20-200 microns, 50-200 microns, or 100-200 microns.

The ash content of the first and second fractions (or a successive fraction) may be selected from, for example, 0.1, 0.2, 0.3, 0.4, 0.5, 0.8, 1, 1.5, 2, 2.5, 3, 3.5, 4, 4.5, 5, 5.5, 6, 7, 8, 9, 10, 12, 15, 20, 25, 30, 35, 40, 45, or 50 wt % or higher, or an ash content within a range bounded by any two of the foregoing values, provided that the ash content of the second fraction is greater than the ash content of the first fraction (e.g., 0.1-1 wt %, 0.1-0.8 wt %, or 0.1-0.5 wt % for the first fraction and 1-15 wt %, 2-15 wt %, 1-12 wt %, or 2-12 wt % for the second fraction). In a first set of embodiments, the first fraction of biomass particles has an ash content of no more than or less than 2 wt % and the second fraction of biomass particles has an ash content greater than 2 wt %, such as an ash content of at least or greater than 2.5, 3, 3.5, 4, 4.5, or 5 wt %. In a second set of embodiments, the first fraction of biomass particles has an ash content less of no more than or less than 1.5 wt % and the second fraction of biomass particles has an ash content greater than 1.5 wt %, such as an ash content of at least or greater than 2, 2.5, 3, 3.5, 4, 4.5, or 5 wt %. In a third set of embodiments, the first fraction of biomass particles has an ash content of no more than or less than 1 wt % and the second fraction of biomass particles has an ash content greater than 1 wt %, such as an ash content of at least or greater than 1.5, 2, 2.5, 3, 3.5, 4, 4.5, or 5 wt %. In a fourth set of embodiments, the first fraction of biomass particles has an ash content of no more than or less than 0.5 wt % and the second fraction of biomass particles has an ash content greater than 0.5 wt %, such as an ash content of at least or greater than 1, 1.5, 2, 2.5, 3, 3.5, 4, 4.5, or 5 wt %. For any of the foregoing embodiments, the ash content of the first fraction may be lower bounded by any values provided above (provided it is less than the maximum value given), and the ash content of the second fraction may be upper bounded by any of the values provided above (provided it is above the minimum value given). Thus, for example, referring to the first embodiment above, the first fraction of biomass particles may have an ash content of 0.1-2 wt % and the second fraction of biomass particles may have an ash content of 2.5-15 wt %, 3-15 wt %, 3.5-15 wt %, 4-15 wt %, 4.5-15 wt %, 5-15 wt %, 2.5-12 wt %, 3-12 wt %, 3.5-12 wt %, 4-12 wt %, 4.5-12 wt %, or 5-12 wt %.

In some embodiments, after producing first and second fractions of biomass particles, as described above, the second fraction of biomass particles is passed through a second screen having a finer mesh size than the first screen to produce a third fraction of biomass particles that passes through the second screen and which has a third particle size which is smaller than the second particle size, wherein the third fraction of biomass has a higher ash content than the second fraction of biomass particles. The second fraction of biomass particles may or may not be subjected to another grinding step before being passed through the second screen. In separate of further embodiments, after producing first and second fractions of biomass particles, as described above, the first fraction of biomass particles is passed through a second screen having a coarser mesh size than the first screen to produce a third fraction of biomass particles that passes through the second screen and which has a third particle size which is smaller than the first particle size but larger than the second particle size, wherein the third fraction of biomass has a higher ash content than the first fraction of biomass particles. The first, second, and third fractions can have any of the particle sizes or ranges thereof, as described above, provided that the ranges do not overlap or overlap to a minute extent.

The biomass can be ground by any suitable method useful in reducing the particle size of solid materials. The grinding method may use, for example, a hammermill (typically for coarse grinding), knife mill (typically for fine grinding), disc mill, jet mill, ball mill, or mortar and pestle process, or any two or more of these in sequence.

In some embodiments, the ground biomass, before or after sieving, is subjected to an ultrasonication process (in water or an aqueous solution) to remove ash from the ground biomass, thereby reducing the ash content of the ground biomass. In a first embodiment, ground biomass that has not yet been sieved is ultrasonicated in water or an aqueous solution to reduce the ash content of the ground biomass (such as to any of the ash content values or ranges provided above), followed by drying and sieving of the ultrasonicated biomass. In a second embodiment, ground biomass (which may or may not have previously been ultrasonicated) is sieved according to the process described above to produce at least two fractions (i.e., at least first and second fractions) differing according to size and ash content, and either the first fraction, second fraction, or successive (e.g., third, fourth, or higher) fraction is ultrasonicated to reduce the ash content of the first fraction, second fraction, or successive fraction. The ash content of the ultrasonicated material may be any of the exemplary value or ranges thereof provided earlier above. The ultrasonication process may employ any of the conditions well known in the art to achieve ultrasonication. For example, the ultrasonication may employ any suitable frequency above 20 kHz, e.g., at least or above 20, 25, 30, 35, 40, 45, 50, 55, or 60 kHz, or a frequency within a range bounded by any two of the foregoing values. The ultrasonication may be applied for any suitable period of time, such as 1, 2, 5, 10, 20, 30, 40, 50 or 60 minutes, or a time within a range bounded by any two of the foregoing values. Following ultrasonication, the ultrasonicated biomass is separated from the water or aqueous solution into which ash material dislodged from biomass particles has settled or remains suspended depending on the size of the ash particles. The wet biomass particles are then dried before further grinding, sieving, and/or use in a process or as a component of a material. Notably, since the ultrasonication process can be applied to a smaller particle size-higher ash fraction (e.g., second or successive fraction), the method has the capability of producing a biomass fraction that has a smaller particle size and reduced ash compared to the original ground biomass or a first fraction of the ground biomass.

In some embodiments, the biomass, prior to or after grinding, and prior to or after sieving, is subjected to a drying step to reduce the moisture content of the biomass. Any method known in the art for drying solid materials, particularly natural or plant-derived materials, can be used. The drying method may include, for example, placing the biomass material in a drying oven at a temperature below the onset of charring or other decomposition, e.g., a temperature of 100° C. or less, such as 90° ° C., 80° C., 70° C., 60° C., 50° C., 40° C., or within a temperature range bounded by any two of these values (e.g., 40-100° C., 50-100° C., 40-80° C., or 50-80° C.) for a period of time effective for appreciably reducing the moisture content of the biomass material. The drying time is typically at least 6, 12, 18, 24, 30, 36, 42, or 48 hours, or a time period bounded by any two of the foregoing values. The drying process typically reduces the moisture content of the biomass to no more than or below 20, 15, 12, 10, 8, or 5 wt %. In some embodiments, the biomass is dried before grinding and sieving steps as described above. In other embodiments, the biomass is ground and then dried before sieving. In other embodiments, the biomass is ground and sieved and then dried. Biomass is typically dried before being used in a biomass-to-biofuel process or before being used to make a composite. In some embodiments, biomass is dried before being ground and further dried after being ground.

Generally, the biomass is plant-derived, i.e., cellulosic or lignocellulosic vegetation. Some particular examples of biomass materials considered herein include, for example, cornstover (e.g., the leaves, husks, stalks, or cobs of corn plants), grasses (e.g., switchgrass, miscanthus, wheat straw, rice straw, barley straw, alfalfa, bamboo, or hemp), sugarcane, hull or shell material (e.g., peanut, rice, and walnut hulls), flax (e.g., flax straw), woodchips, saw dust, paper or wood pulp, food waste, agricultural waste, and forest waste. If wood biomass is used, the wood may be a softwood or hardwood. Some examples of types of wood biomass include poplar, pine, and aspen. In one embodiment, the biomass material is in its native form, i.e., unmodified except for natural degradation processes, before being ground and sieved. In another embodiment, the biomass material is modified by, for example, drying or by physical modification in the substantial absence of decomposition (e.g., mashing, grinding, compacting, blending, heating, steaming, bleaching, nitrogenating, oxygenating, or sulfurating), before being ground and sieved.

In another aspect, the present disclosure is directed to a method for producing biofuel from biomass containing a reduced ash content. In the method, biomass material is processed by grinding and sieving and any other optional steps as described above (e.g., drying, ultrasonication, oxygenating, bleaching, etc.) to produce one or more biomass fractions containing a reduced ash content, and subjecting the reduced ash fraction (e.g., a first or subsequently processed fraction) to a biomass-to-biofuel conversion process. The ash content of the biomass used in the biofuel production process may have any of the reduced ash contents described earlier above. In a first set of embodiments, the biomass has an ash content of no more than or less than 2 wt %. In a second set of embodiments, the biomass has an ash content of no more than or less than 1.5 wt %. In a third set of embodiments, the biomass has an ash content of no more than or less than 1 wt %. In a fourth set of embodiments, the biomass has an ash content of no more than or less than 0.5 wt %. In other embodiments, the biomass has an ash content of no more than or less than 0.4, 0.3, 0.2, or 0.1 wt %. In other embodiments, the biomass has an ash content within a range of, for example, 0.1-2 wt %, 0.2-2 wt %, 0.5-2 wt %, 1-2 wt %, 0.1-1 wt %, 0.2-1 wt %, 0.5-1 wt %, 0.1-0.8 wt %. 0.2-0.8 wt %, or 0.5-0.8 wt %. Biomass-to-biofuel production processes are well known in the art. The biofuel production process may be a first generation or second generation process and may produce a liquid or gaseous biofuel, as well known in the art. Some types of biofuel production methods include gasification, pyrolysis, hydrothermal liquefaction, biomass-to-liquids (BTL), and biohydrogen processes. Pyrolysis can effectively convert biomass to biochar, gas, and liquid biofuel. Elevated ash content (e.g., higher than 1 wt %) is known to be detrimental to pyrolysis of biomass for biofuel generation.

In another aspect, the present disclosure is directed to a method for producing a polymer-biomass composite material (i.e., "composite") using biomass having an increased level of ash. In the method, biomass material is processed by grinding and sieving and any other optional steps as described above (e.g., drying, ultrasonication, oxygenating, bleaching, etc.) to produce one or more biomass fractions containing an increased ash content, and the increased ash fraction (e.g., a second or subsequently processed fraction) is melt compounded with a thermoplastic polymer to produce the polymer-biomass composite material. The ash content of the biomass incorporated into the composite may have any of the increased ash contents described earlier above. In a first set of embodiments, the biomass has an ash content of at least or greater than 1 wt %. In a second set of embodiments, the biomass has an ash content of at least or greater than 1.5 wt %. In a third set of embodiments, the biomass has an ash content of at least or greater than 2 wt %. In a fourth set of embodiments, the biomass has an ash content of at least or greater than 2.5 wt %. In other embodiments, the biomass has an ash content of at least or greater than 3, 4, 5, 6, 7, 8, 9, 10, 11, or 12 wt %. In other embodiments, the biomass has an ash content within a range of, for example, 1-15 wt %, 2-15 wt %, 5-15 wt %, 1-12 wt %, 2-12 wt %, 5-12 wt %, 1-10 wt %, 2-10 wt %, 5-10 wt %, 10-50 wt %, 10-20 wt %, or 10-15 wt %. Melt compounding processes are well known in the art. In some embodiments, after melt compounding, the resulting composite is subjected to hot pressing and/or compression molding to produce a shape of the composite. The thermoplastic polymer may be any of the polymers known in the art having thermoplastic behavior and which can undergo melt compounding to form a solid composite with biomass particles. The thermoplastic polymer may be, for example, a polyester (e.g., PET, PETG, PLA, PGA, PHA, PBS, or copolymer or mixture thereof), a rubber (e.g., acrylonitrile-containing copolymer, such as ABS, or isoprene-containing rubber), or polyolefin (e.g., polyethylene, polypropylene, LDPE, HDPE, PVC, PVDF, polystyrene, or copolymer thereof). Other thermoplastic polymers that may be used include thermoplastic epoxies, polyurethanes, and nylons. In specific embodiments, a composite is produced containing polylactic acid (PLA) or copolymer thereof and reduced ash biomass particles, such as switchgrass, pine, corn stover, poplar, grass, or sugarcane residue. The hardened or cured polymer in the composite may be a thermoplastic or thermoset. In some embodiments, the polymer-biomass composite is of sufficient tensile strength to be used as a feed material for an extrusion or additive manufacturing (e.g., 3D printing) process. In some embodiments, the composite is used as a feed material in an extrusion or additive manufacturing process to produce an object partly or completely constructed of the composite material.

Examples have been set forth below for the purpose of illustration and to describe certain specific embodiments of the invention. However, the scope of this invention is not to be in any way limited by the examples set forth herein.

EXAMPLES

Scanning electron microscopy (SEM) analysis of composites: SEM microscopy (~5 kV) was utilized for detecting the fracture surface topography of the samples after the mechanical tests. The resulting fracture surface was sputtered using gold (gold sputtering thickness: ~6 nm) in advance of the SEM analysis.

Rheological characterization of composites: The rheological characteristics (viscosity and storage modulus) of materials (each sample: ~0.4 g) were determined utilizing a TA Instruments rheometer. The temperature was set to 180° C. with a sweep of frequency starting with 0.1 rad/s. After the strain sweep (at 100 rad/s) from 0.01% to 50%, an appropriate strain within a linear viscoelastic region was selected. The gap was set as 600 μm, and the diameter of the aluminum plates was 8 mm.

Tensile testing of composites: Dog-bone specimens were tested on a tensile testing machine (servo-hydraulic) using commercial software. The failure strain, Young's modulus, and tensile strength were tested. The gauge length with 12.700 mm and strain rate with 1.524 mm/min were used. A strain channel of stroke of 3 inches and an extensometer were used. A custom servo-hydraulic, four-post frame was used as the test frame. Each specimen was tested three times, and average values were reported.

Figures 2A, 2B:
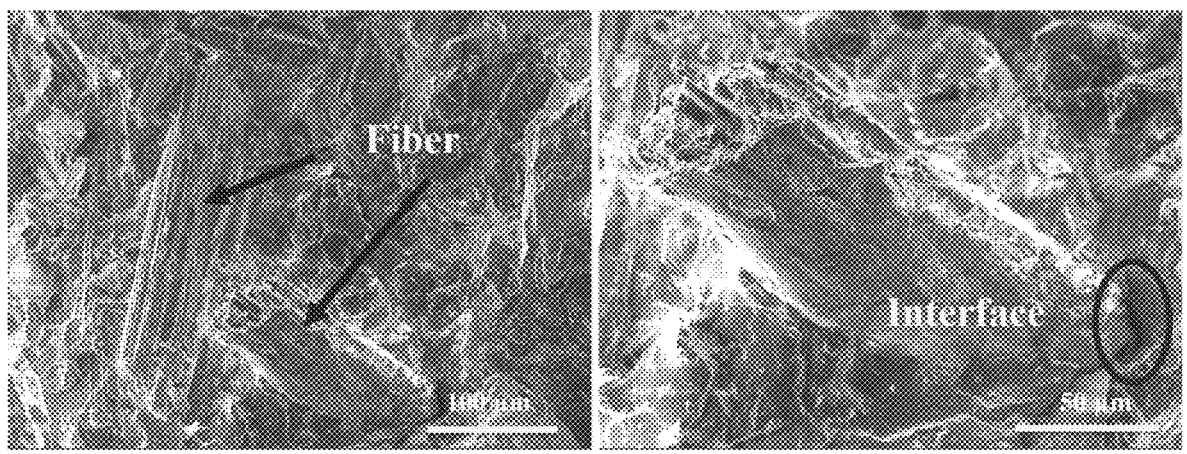
FIGS. 2A-2B.
Figures 3A, 3B:
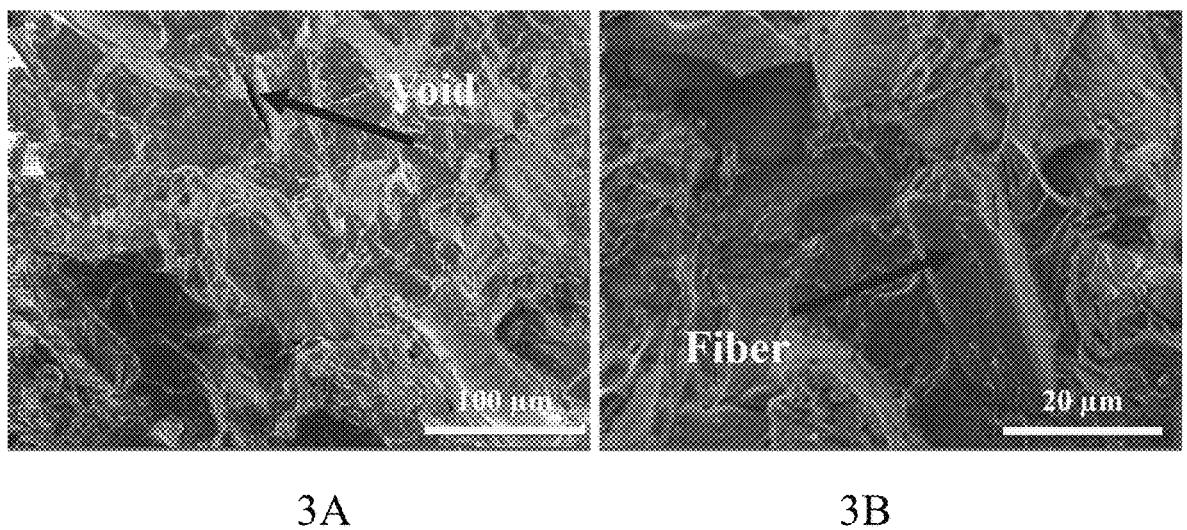
FIGS. 3A-3B.
Figures 4A, 4B:
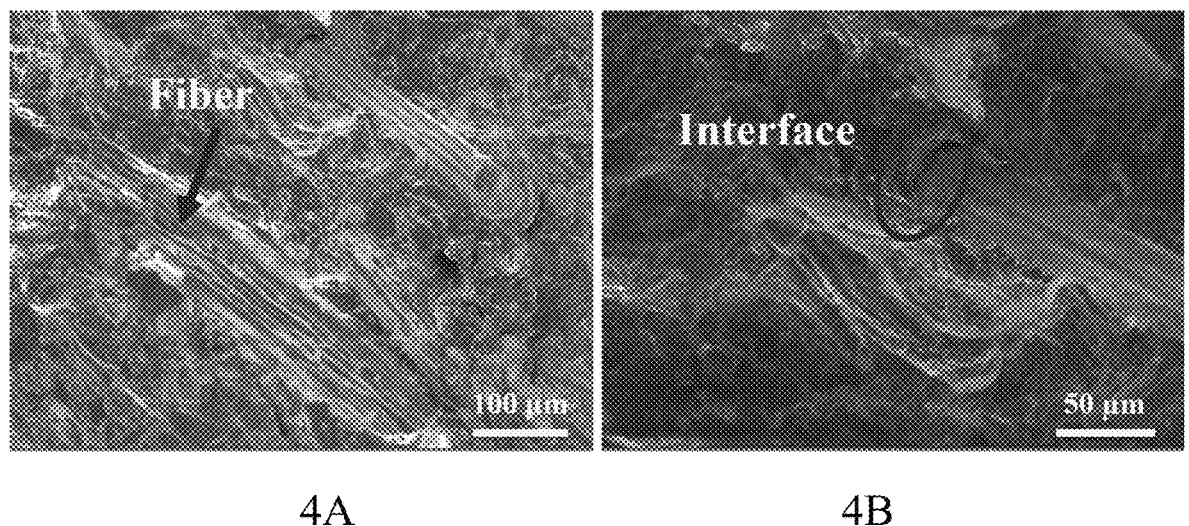
FIGS. 4A-4B.
Figures 5A, 5B:
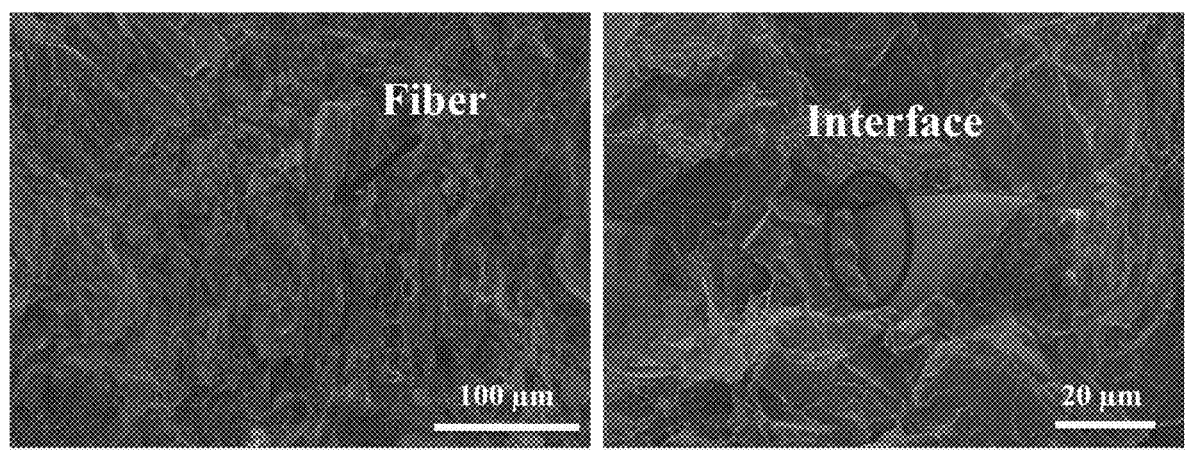
FIGS. 5A-5B.
Figures 6A, 6B:
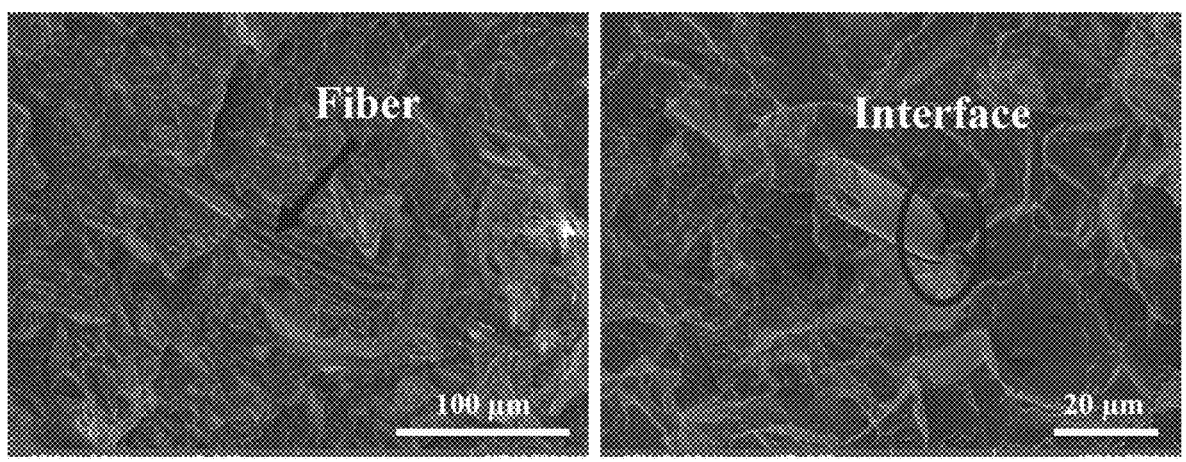
FIGS. 6A-6B.
Figures 7A, 7B:
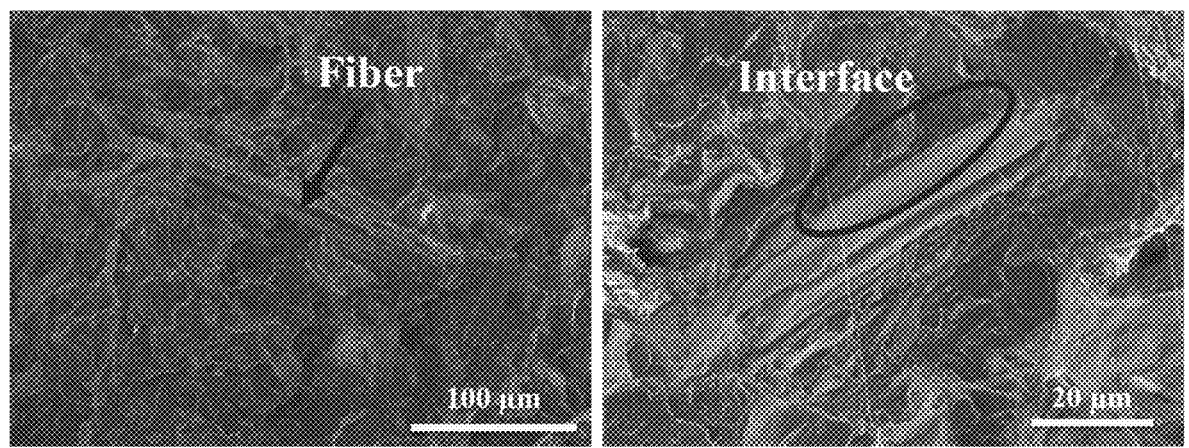
FIGS. 7A-7B.
Figure 8A:
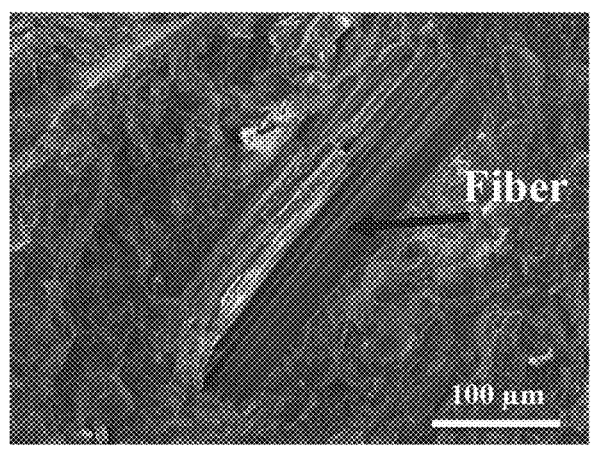
FIGS. 8A-8B.
Figure 8B:
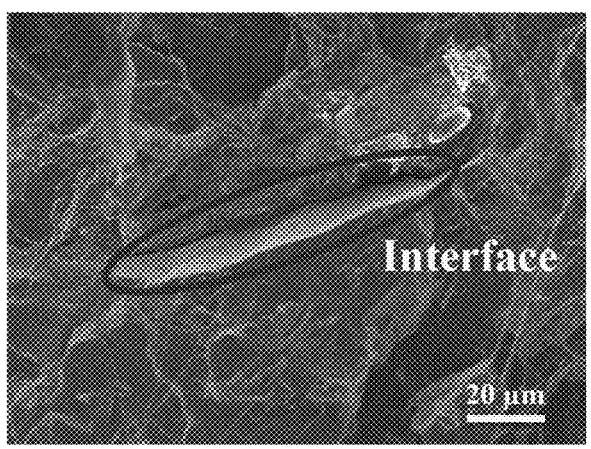
Figures 9A, 9B:
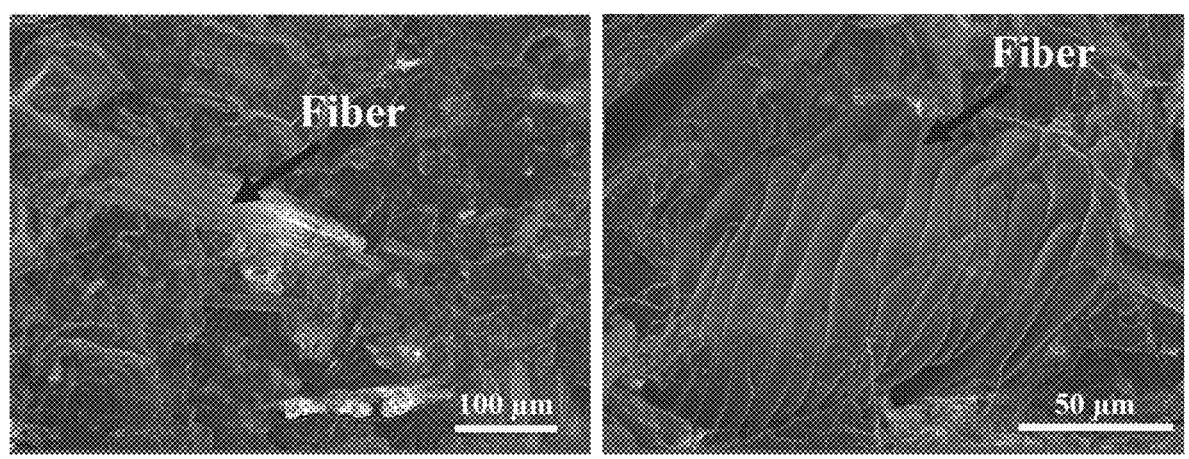
FIGS. 9A-9B.

SEM results: FIGS. 1A through 9B show the fracture surface images of pure PLA, switchgrass/PLA composites, and corn stover/PLA composites after the mechanical testing. Specifically: FIG. 1A is a scanning electron microscope (SEM) image of fracture surfaces of neat PLA, while FIG. 1B is the same image at higher magnification. FIG. 2A is a SEM image of fracture surfaces of a switchgrass I/PLA composite, while FIG. 2B is the same image at higher magnification. FIG. 3A is a SEM image of fracture surfaces of a switchgrass II/PLA composite, while FIG. 3B is the same image at higher magnification. FIG. 4A is a SEM image of fracture surfaces of a switchgrass III/PLA composite, while FIG. 4B is the same image at higher magnification. FIG. 5A is a SEM image of fracture surfaces of a corn stover I/PLA composite, while FIG. 5B is the same image at higher magnification. FIG. 6A is a SEM image of fracture surfaces of a corn stover II/PLA composite, while FIG. 6B is the same image at higher magnification. FIG. 7A is a SEM image of fracture surfaces of a corn stover III/PLA composite, while FIG. 7B is the same image at higher magnification. FIG. 8A is a SEM image of fracture surfaces of a corn stover IV/PLA composite, while FIG. 8B is the same image at higher magnification. FIG. 9A is a SEM image of fracture surfaces of a corn stover V/PLA composite, while FIG. 9B is the same image at higher magnification. Table 1 below provides the meanings the different types of feedstocks indicated above.

TABLE 1

Notation of biomass fibers with different ash contents.

| Feedstock | Total ash (wt. %) |
|---|---|
| Switchgrass I | 0.7 ± 0.1 |
| Switchgrass II | 1.2 ± 0.1 |
| Switchgrass III | 2.1 ± 0.2 |
| Corn stover I | 2.2 ± 0.2 |
| Corn stover II | 4.6 ± 0.2 |
| Corn stover III | 7.5 ± 0.1 |
| Corn stover IV | 10.5 ± 0.1 |
| Corn stover V | 11.9 ± 0.4 |

Pure polymer PLA displayed a comparatively glossy surface [Reference: X. Zhao, K. Li, Y. Wang, H. Tekinalp, G. Larsen, D. Rasmussen, R. S. Ginder, L. Wang, D. J. Gardner, M. Tajvidi, E. Webb, S. Ozcan, High-strength polylactic acid (PLA) biocomposites reinforced by epoxy-modified pine fibers, ACS Sustain Chem Eng, 8 (2020) 13236-13247.]. The addition of switchgrass or corn stover fibers resulted in a matrix-fiber interface. This indicates an inferior matrix-fiber interfacial adhesion, which is consistent with the lower tensile strength with incorporating natural fibers into the PLA. Similarly, CF/ABS (carbon fiber/acrylonitrile butadiene styrene) composites that were previously prepared exhibited a similarly poor fiber-matrix interfacial adhesion [H. L. Tekinalp, V. Kunc, G. M. Velez-Garcia, C. E. Duty, L. J. Love, A. K. Naskar, C. A. Blue, S. Ozcan, Highly oriented carbon fiber-polymer composites via additive manufacturing, Compos Sci Technol, 105 (2014) 144-150.]. Surface treatments (e.g., epoxy) on the natural fibers could be utilized to mitigate the matrix-fiber interfacial adhesion for achieving higher mechanical properties. The switchgrass fibers contained pores on the surface. Switchgrass fibers with different or even the same ash contents exhibited different structures and sizes, which can affect the performance of the resulting composites. The biomass fractionation could also have separated different anatomical tissues. Similarly, the corn stover fibers contained pores and small pieces on the surface, and exhibited different structures. The heterogeneous characteristics of natural fibers can make it challenging to accurately determine which factors (e.g., fiber inhomogeneity and ash content) play critical roles in composite performance.

Figure 10:
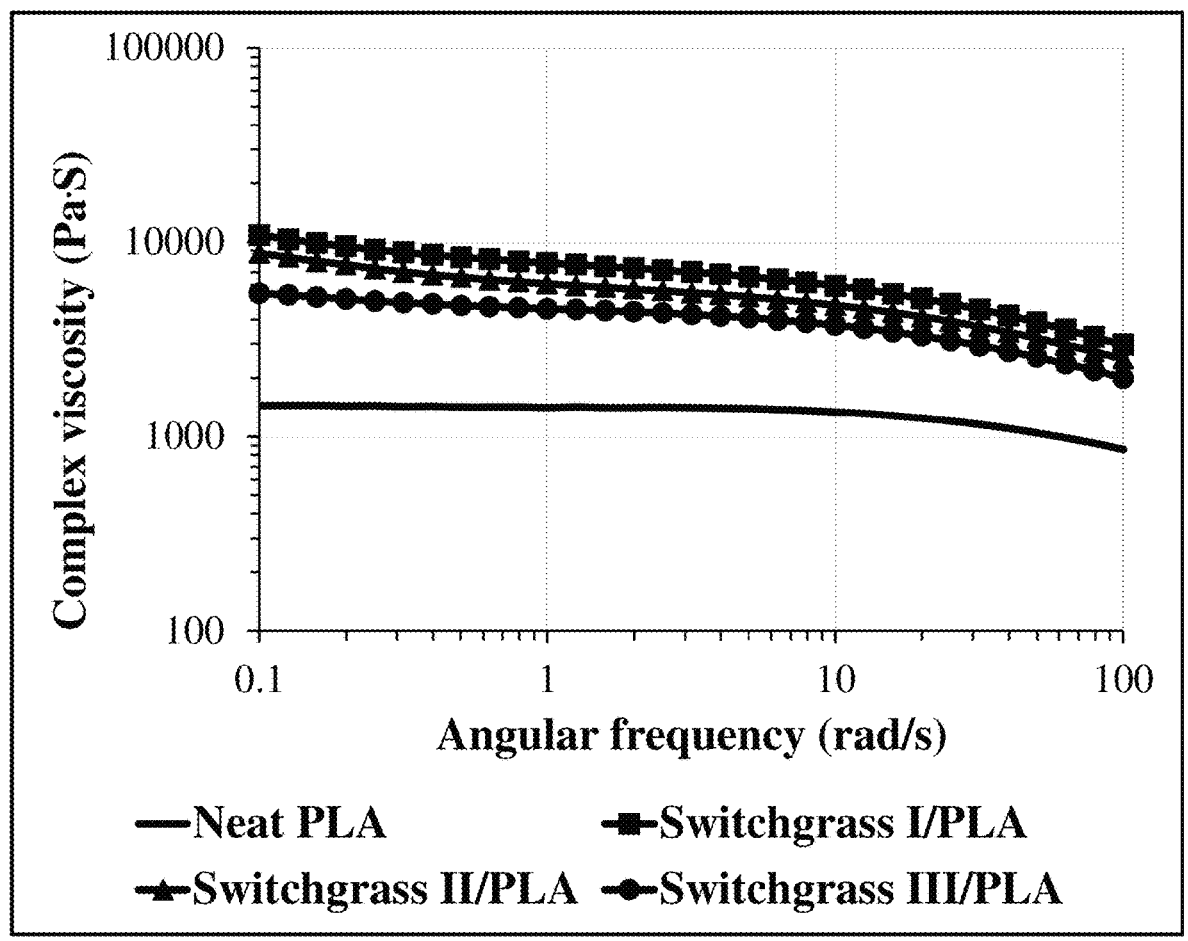
FIG. 10. Graph showing change in complex viscosity as a function of the angular frequency of neat PLA and switchgrass/PLA composites at three different fiber ash contents (0.7, 1.2, and 2.1 wt %).

Rheological results: FIG. 10 shows the complex viscosity (change with radial frequency) of pure PLA and switchgrass/PLA composites at three different fiber ash contents (0.7, 1.2, and 2.1 wt %). The viscosity of neat PLA was smaller than the viscosity value of switchgrass/PLA composites. The chain-chain interaction between switchgrass fillers and the polymer can demand stronger shear forces to flow in comparison with that of pure PLA. These complex viscosities of both pure PLA and switchgrass/PLA composites showed a decreasing trend as the angular frequency increased, thereby indicating non-Newtonian fluid. This behavior is beneficial for 3D printing at large scales because the energy requirements can be reduced during the printing process. In addition, high complex viscosity value at a low radial frequency is favorable for 3D printing at large scales for the reason that the squeezed material can preserve its shape (or structure) after the deposition. At the radial frequency of 3.2 rad/s, the viscosities of switchgrass/PLA composites were varying from 4.2 kPa·s to 7.0 kPa·s. These viscosity values fit the scope of 0.2-15 kPa's formerly utilized to smoothly 3D print materials [Reference: X. Zhao, K. Li, Y. Wang, H. Tekinalp, G. Larsen, D. Rasmussen, R. S. Ginder, L. Wang, D. J. Gardner, M. Tajvidi, E. Webb, S. Ozcan, High-strength polylactic acid (PLA) biocomposites reinforced by epoxy-modified pine fibers, ACS Sustain Chem Eng, 8 (2020) 13236-13247.]. Therefore, all of these switchgrass/PLA composite materials can satisfy the viscous flowing criteria for 3D printing thermoplastic composites.

The complex viscosity of switchgrass/PLA composites declined with the increment of fiber ash contents (0.7, 1.2, and 2.1 wt %). This is probably related to the ash particle shape of the switchgrass. The ball shapes of some ash particles indicate a ball-bearing mechanism during the rheology testing process, which may promote the shearing of materials.

Figure 11:
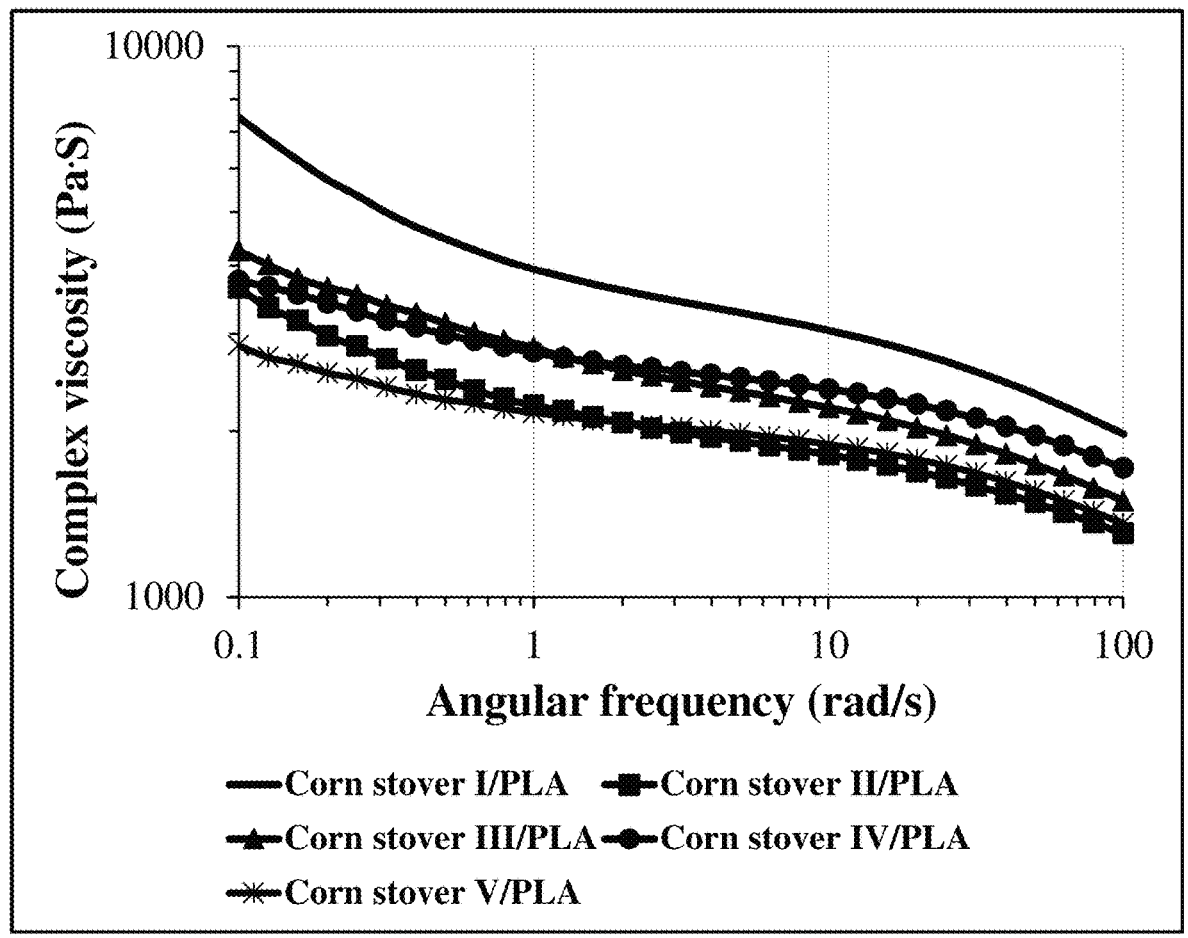
FIG. 11. Graph showing change in complex viscosity as a function of the angular frequency of corn stover/PLA composites at five different fiber ash contents (2.2, 4.6, 7.5, 10.5, and 11.9 wt %).

FIG. 11 shows the complex viscosity of corn stover/PLA composites at five different fiber ash contents (2.2-11.9 wt %). Similarly, the viscosity of neat PLA was smaller than the viscosity value of corn stover/PLA composites. These complex viscosities of corn stover/PLA composites showed a declining trend with the increment of the radial frequency, thereby suggesting a shear-thinning behavior. At the radial frequency of 3.2 rad/s, the viscosity values of corn stover/PLA composites were varying from 2.0 kPa·s to 3.4 kPa·s. Therefore, all of these corn stover/PLA composites are suitable for 3D printing at large scales.

Figure 12:
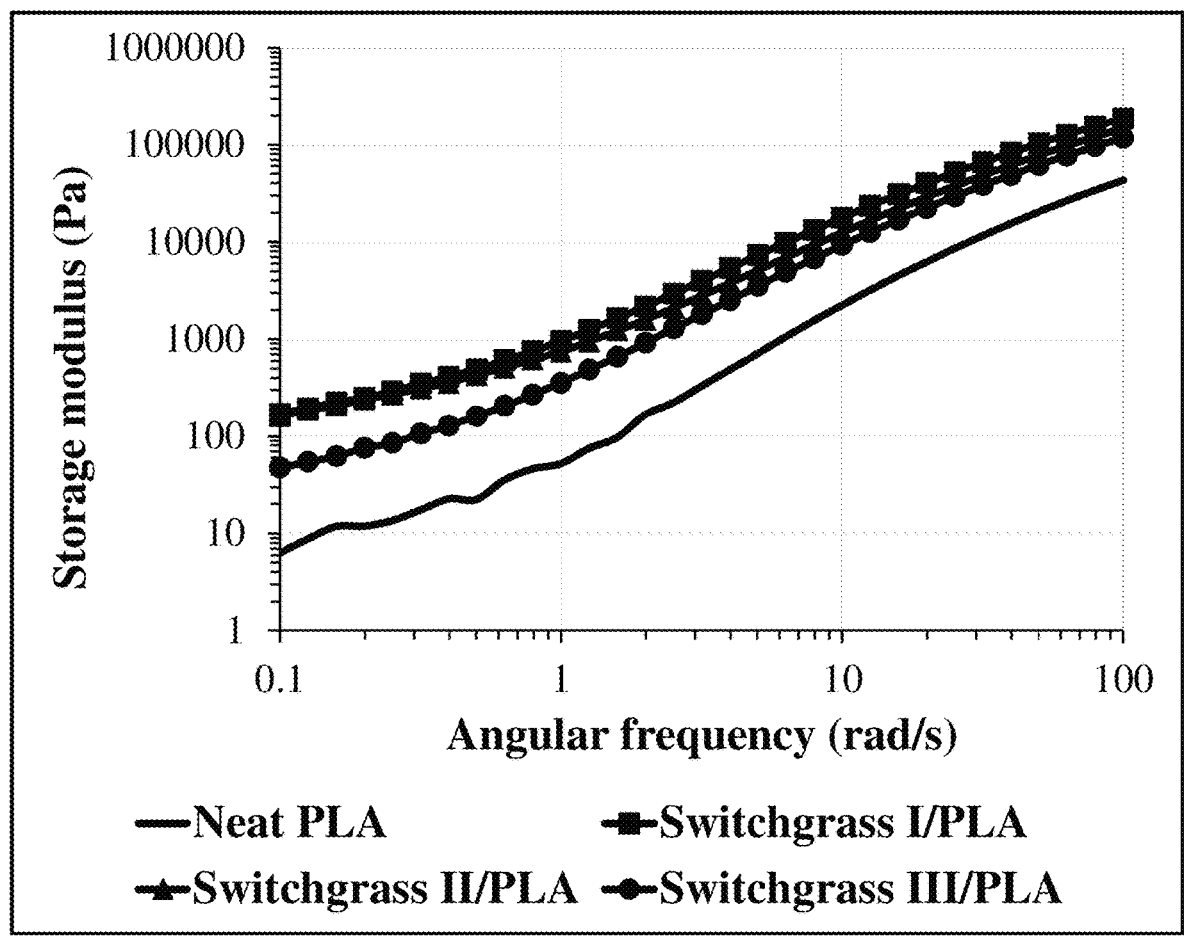
FIG. 12. Graph showing change in storage modulus as a function of the angular frequency of neat PLA and switchgrass/PLA composites at three different fiber ash contents (0.7, 1.2, and 2.1 wt %).

FIG. 12 shows the storage modulus (change with radial frequency) of pure PLA and switchgrass/PLA composites at three different fiber ash contents (0.7, 1.2, and 2.1 wt %). At 0.1 rad/s, the storage modulus of neat PLA was lower than the storage modulus of the switchgrass/PLA composites.

Figure 13:
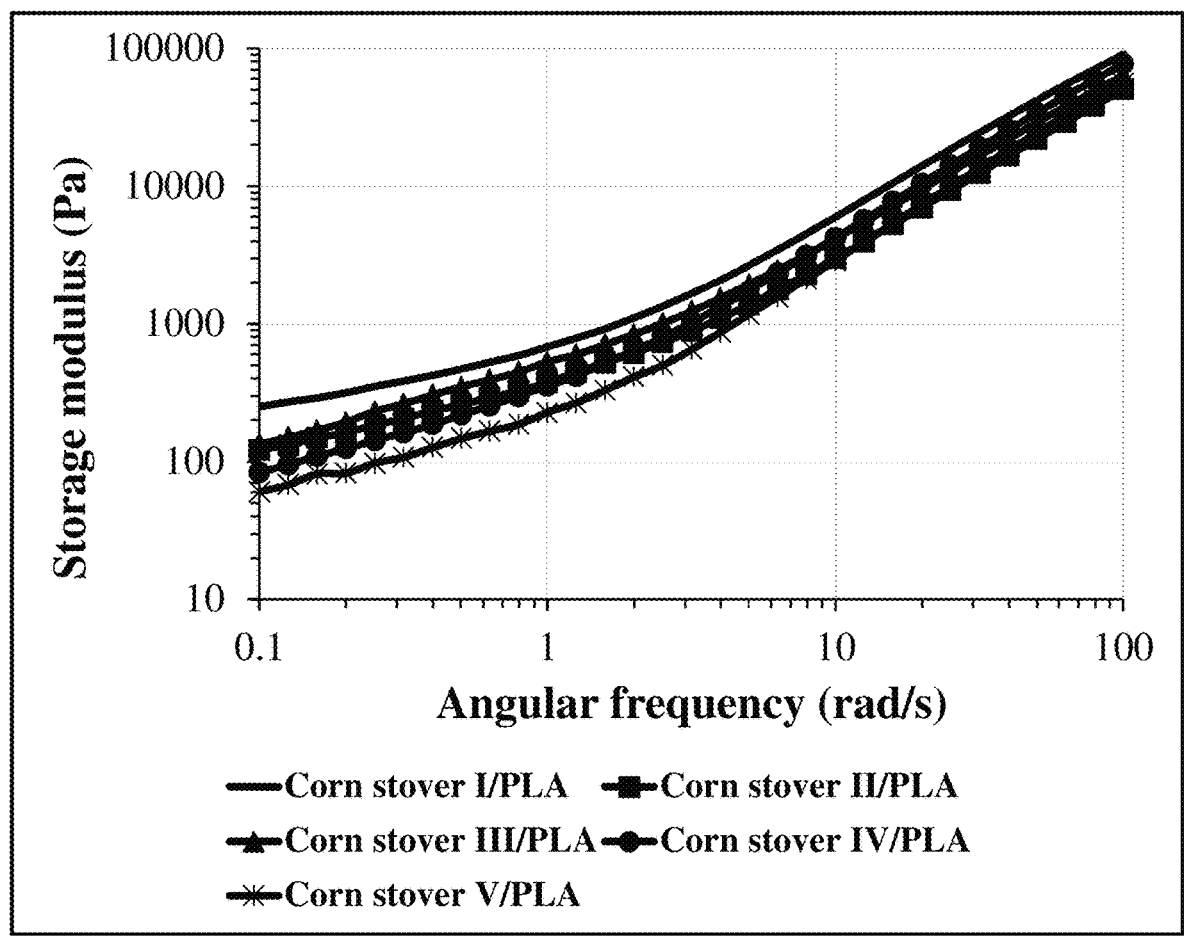
FIG. 13. Graph showing change in storage modulus as a function of the angular frequency of corn stover/PLA composites at five different fiber ash contents (2.2, 4.6, 7.5, 10.5, and 11.9 wt %).

At 0.1 rad/s, both the storage modulus and the viscosity declined with the increment in the fiber ash amount from 0.7 to 2.1 wt %. FIG. 13 shows the storage modulus of corn stover/PLA composites at five different fiber ash contents. Similarly, at 0.1 rad/s, the storage modulus of neat PLA was lower than the storage modulus of corn stover/PLA composites. At 100 rad/s, no clear trend emerged for the storage modulus change for corn stover/PLA composites when the fiber ash content changed from 2.2 to 11.9 wt %.

Mechanical property results: Table 2 (below) exhibits the mechanical performance of pure PLA and natural fiber/PLA composites. In comparison with neat PLA, the switchgrass/PLA composites had a 5-13% lower tensile strength, a 51-56% lower failure strain, and a 31-40% higher Young's modulus. These composite materials' low strength indicates the low interfacial adhesion between natural fillers and the PLA matrix. Considering the mechanism of mixing two incompatible components (i.e., natural filler is hydrophilic and PLA plastic is hydrophobic), the observed results are consistent with these properties. In addition, the low strength of the switchgrass/PLA composites may be related to the milling of biomass which can cause defects in the fibers. The low failure strain of the composites could possibly be caused by the addition of a solid phase into an elastic phase. Despite this, the high Young's modulus of the composites suggests a reinforcement effect of natural fibers in the PLA polymer.

TABLE 2

Comparison of tensile properties for neat PLA and natural fiber/PLA composites (average ± standard deviation). Natural fibers contain different ash contents, and the resulting composites consist of 20 wt % of fiber and 80 wt % of polymer. The ash does not have a large influence on the tensile strength of corn stover/PLA and switchgrass/PLA composites.

| Compound product | Tensile strength (MPa) | Young's modulus (MPa) | Failure strain (%) |
| --- | --- | --- | --- |
| Neat PLA | 60 ± 1 | 3169 ± 5 | 8.5 ± 2.1 |
| Switchgrass I/PLA | 57 ± 2 | 4141 ± 199 | 4.2 ± 0.5 |
| Switchgrass II/PLA | 56 ± 1 | 4422 ± 42 | 3.7 ± 0.4 |
| Switchgrass III/PLA | 52 ± 0.4 | 4286 ± 215 | 3.8 ± 0.3 |
| Corn stover I/PLA | 50 ± 2 | 4233 ± 57 | 4.0 ± 0.2 |
| Corn stover II/PLA | 50 ± 2 | 3999 ± 107 | 4.0 ± 0.1 |
| Corn stover III/PLA | 53 ± 1 | 4215 ± 89 | 4.2 ± 0.1 |
| Corn stover IV/PLA | 49 ± 1 | 3932 ± 125 | 4.1 ± 0.1 |
| Corn stover V/PLA | 51 ± 1 | 4082 ± 156 | 4.3 ± 0.3 |
| 40 wt % wood/PLA [1] | 74 | 3330 | 4.2 |
| 10 wt % ash/40 wt % wood/PLA [1] | 60 | 6770 | 1.0 |

[1] Reference: T. Ozyhar, F. Baradel, J. Zoppe, Effect of functional mineral additive on processability and material properties of wood-fiber reinforced poly(lactic acid) (PLA) composites, Compos Part A-Appl S, 132 (2020) 105827.

One research goal of the present experiments is to achieve 47 MPa (tensile strength value), which is 75% of the tensile strength of carbon fiber (CF)/acrylonitrile butadiene styrene (ABS), which is a conventional feedstock material utilized for large-scale additive manufacturing. All three switchgrass/PLA composites exhibited a higher tensile strength than 47 MPa, indicating that the off-spec high-ash switchgrass fibers can be effectively utilized for biocomposite applications. With increasing the ash amount of the switchgrass fiber from 0.7 wt % to 2.1 wt %, the resulting switchgrass/PLA composites exhibited a slight decrease (by 9%) in the tensile strength. This result indicates that the increased ash content has a slightly negative impact on the switchgrass/PLA composites, although no difference was observed with the 0.7 and 1.2 wt % ash samples. To maintain the tensile strength of the biofiber/PLA composites when the ash content remains high, surface treatment methods ACS Sustain Chem Eng, 8 (2020) 13236-13247 can be applied, e.g., epoxy surface modification to improve the interface, such as described in X. Zhao et al., ACS Sustain Chem Eng, 8 (2020) 13236-13247, as incorporated herein. Such surface treatment is capable to enhance the interfacial adhesion between biofibers and the PLA matrix, which can improve tensile characteristics of the natural fiber/PLA biocomposites by promoting better load transfer.

In comparison with neat PLA, the corn stover/PLA composites had a 12-18% lower tensile strength, a 49-53% lower failure strain, and a 24-34% higher Young's modulus. When increasing the ash amount of the corn stover fiber from 2.2 wt % to 11.9 wt %, the obtained corn stover/PLA composites exhibited an insignificant increment in the tensile strength by 2%. This result indicates that the increased ash content has a minor impact on the corn stover/PLA composites. High ash content does not impact the corn stover/PLA composite properties. A possible mechanism is that ash particles can play a role of fibers, which causes little or no difference on the total fiber impact. The present results indicate that, compared to corn stover/PLA composites, the ultimate strength of switchgrass/PLA composites is affected more by the ash content. This indicates that the fiber species has a significant impact on the ash-based composites. Knowing why the impact of ash content and composition (e.g., individual ash component) on the switchgrass/PLA composites and corn stover/PLA composites is different is of significant interest. The Ca content in corn stover feedstock (I, II, III, and IV) was constant while varying the total ash concentration, thereby indicating that there might be a relationship between the Ca content and the ultimate strength of corn stover/PLA composites.

While there have been shown and described what are at present considered the preferred embodiments of the invention, those skilled in the art may make various changes and modifications which remain within the scope of the invention defined by the appended claims.

What is claimed is:

1. A method for fractionating biomass material according to ash content, the method comprising: grinding the biomass material to produce a ground biomass and sieving the ground biomass through a first screen to yield: a) a first fraction of biomass particles that does not pass through the first screen and which has a first particle size, and b) a second fraction of biomass particles that passes through the first screen and which has a second particle size, wherein the second particle size is smaller than the first particle size, and wherein the second fraction of biomass particles has a higher ash content than the first fraction of biomass particles.

2. The method of claim 1, further comprising: passing the second fraction of biomass particles through a second screen having a finer mesh size to produce a third fraction of biomass that passes through the second screen and which has a third particle size which is smaller than the second particle size, wherein the third fraction of biomass has a higher ash content than the second fraction of biomass particles.

3. The method of claim 1, wherein the ground biomass before sieving has a maximum particle size of 1000 microns.

4. The method of claim 1, wherein the ground biomass before sieving has a maximum particle size of 500 microns.

5. The method of claim 1, wherein the ground biomass before sieving has a maximum particle size of 300 microns.

6. The method of claim 1, wherein the ground mass before sieving has a maximum particle size of 200 microns.

7. The method of claim 1, wherein the first fraction of biomass particles has an ash content less than 1 wt % and the second fraction of biomass particles has an ash content greater than 1 wt %.

8. The method of claim 1, wherein the first fraction of biomass particles has an ash content less than 1 wt % and the second fraction of biomass particles has an ash content of at least 5 wt %.

9. The method of claim 1, wherein the ash comprises at least three elements selected from Ca, Fe, Mg, K, Si, Al, S, P, and Mn.

10. The method of claim 1, wherein the biomass comprises lignocellulosic matter.

11. The method of claim 1, wherein the biomass is selected from the group consisting of corn stover, grasses, hull material, wood, hemp, flax, and sugarcane.

12. The method of claim 1, wherein, prior to said grinding step, the biomass material is subjected to a drying process to reduce the moisture content.

13. The method of claim 1, wherein the ground biomass, before or after sieving, is subjected to an ultrasonication process to result in a reduced ash content of the ultrasonicated ground biomass.

14. A method for producing biofuel from biomass containing a reduced ash content, the method comprising:
  (i) grinding biomass material to produce a ground biomass and sieving the ground biomass through a first screen to yield: a) a first fraction of biomass particles that does not pass through the first screen and which has a first particle size, and b) a second fraction of biomass particles that passes through the first screen and which has a second particle size, wherein the second particle size is smaller than the first particle size, and wherein the second fraction of biomass particles has a higher ash content than the first fraction of biomass particles; and
  (ii) subjecting the first fraction of biomass particles to a biomass-to-biofuel conversion process.

15. The method of claim 14, wherein the first fraction of biomass particles is subjected to an ultrasonication process to further reduce the ash content of the first fraction.

16. The method of claim 14, wherein the first fraction of biomass particles has an ash content less than 1 wt %.

17. The method of claim 14, wherein the first fraction of biomass particles has an ash content of no more than 0.5 wt %.

18. A method for producing a polymer-biomass composite material using biomass having an increased level of ash, the method comprising:
  (i) grinding biomass material to produce a ground biomass and sieving the ground biomass through a first screen to yield: a) a first fraction of biomass particles that does not pass through the first screen and which has a first particle size, and b) a second fraction of biomass particles that passes through the first screen and which has a second particle size, wherein the second particle size is smaller than the first particle size, and wherein the second fraction of biomass particles has a higher ash content than the first fraction of biomass particles; and
  (ii) melt compounding the second fraction of biomass particles with a thermoplastic polymer to produce the polymer-biomass composite material.

19. The method of claim 18, wherein the polymer-biomass composite material produced in step (ii) is subjected to hot pressing and/or compression molding.

20. The method of claim 18, wherein the second fraction of biomass particles has an ash content greater than 1 wt %.

21. The method of claim 18, wherein the second fraction of biomass particles has an ash content of at least 5 wt %.

22. The method of claim 18, wherein the thermoplastic polymer is selected from polyesters, rubbers, and polyolefins.

23. A polymer-biomass composite material comprising a mixture of a thermoplastic polymer and biomass particles having an ash content greater than 1 wt %.

24. The polymer-biomass composite material of claim 23, wherein the biomass particles have an ash content of at least 5 wt %.

25. The polymer-biomass composite material of claim 23, wherein the biomass particles have an ash content of at least 10 wt %.

* * * * *